United States Patent

[11] 3,586,154

| | | |
|---|---|---|
| [72] | Inventor | William G. Schultz<br>Rocanville, Saskatchewan, Canada |
| [21] | Appl. No. | 869,444 |
| [22] | Filed | Oct. 13, 1969 |
| [45] | Patented | June 22, 1971 |
| [73] | Assignee | Hudson Bay Mining and Smelting Co.<br>Toronto-Dominion Centre, Toronto,<br>Ontario, Canada<br>a part interest |
| [32] | Priority | Jan. 16, 1969 |
| [33] | | Canada |
| [31] | | 040,318 |

[54] EXTENSIBLE CONVEYOR
12 Claims, 4 Drawing Figs.

[52] U.S. Cl. .................................................. 198/139,
198/186
[51] Int. Cl. ......................................................... B65g 15/00
[50] Field of Search ............................................. 198/186,
139, 88

[56] References Cited
UNITED STATES PATENTS

| 2,633,974 | 4/1953 | Jackson | 198/186 |
|---|---|---|---|
| 2,852,127 | 9/1958 | Barrett | 198/139 |

*Primary Examiner*—Gerald M. Forlenza
*Assistant Examiner*—John Mannix
*Attorney*—Weir, Marshall, MacRae & Lamb ABSTRACT: A belt conveyor system of the type having a tail section which is movable with a loading machine for receiving and transferring material from the loading machine to a fixed discharge point. A drive unit is separate from and located between a holdback unit and a tail terminal unit, the latter moving with the loading machine. The holdback and drive units are connected by guide cables which carry a movable belt-tensioning drum. The movement of the belt-tensioning drum along the cables is controlled by the holdback unit. The upper flight of the belt, which extends between the belt-tensioning drum and the tail terminal unit, passes around drive drums of the drive unit in a manner to provide a discharge point at the drive unit.

PATENTED JUN22 1971 3,586,154

INVENTOR
William G. Schultz
BY Weir, Marshall,
MacRae & Lamb.
PATENT AGENT

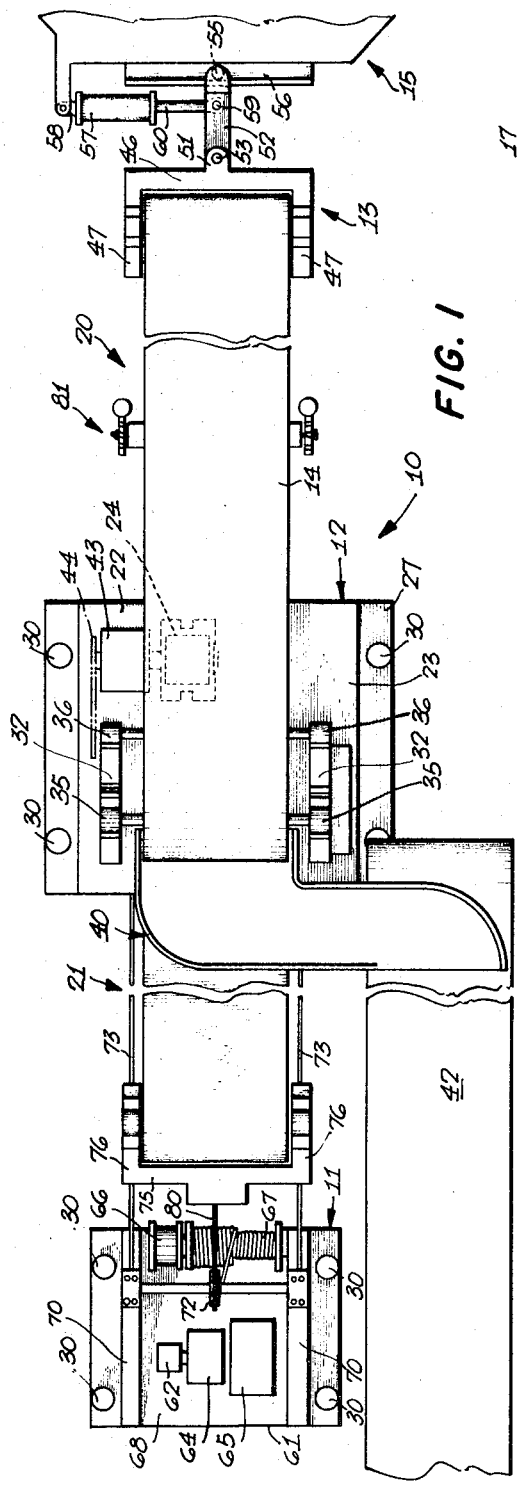
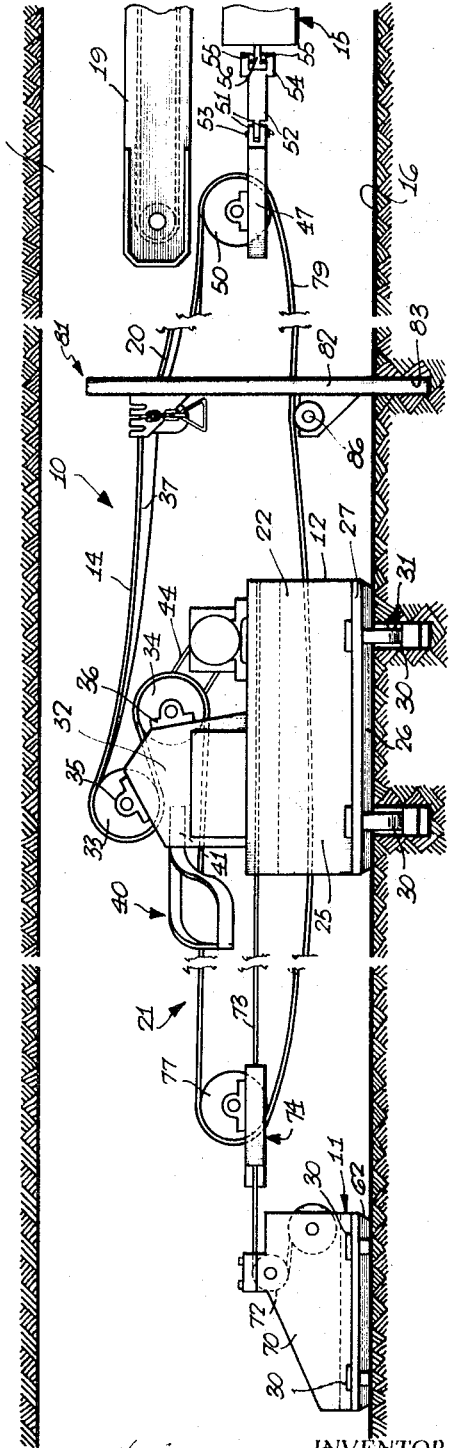

EXTENSIBLE CONVEYOR

BACKGROUND OF THE INVENTION

In the excavation field and particularly in the mining industry continuously advancing digging or boring machines are now utilized to remove the material at the end of a passageway and thus move deeper into the passageway as they extend the passageway. Such machines are designed to convey the material to their rear as the material is removed, and various types of conveyors have been developed to receive the material from this type of machine and to carry the material back away from the end of the passageway as the machine advances. One practical type of belt conveyor used with the boring machine includes an extendible portion and a belt storage mechanism, and during travel of the boring machine the extendable portion is elongated so as to keep the outer end of the extendable portion immediately behind the boring machine for continuously receiving the material being removed from the head of the passageway. Belt is removed from the storage mechanism so as to provide extra belt for the material-carrying portion as it is elongated. The extendible portion and the belt storage mechanism of the known conveyors are commonly mounted in a large and elaborate framework and are provided with a complex actuating apparatus for providing the extending action. As a result, the conveyors have been expensive to produce and maintain. Moreover, because of the large framework, difficulties are experienced in transporting the conveyor from one location to another particularly in the mines. Certain of the known conveyors also have the disadvantage of only a limited range of elongation, which range is dependent on the expansion capabilities of the framework.

SUMMARY

The conveyor of the present invention has separate holdback, drive and tail terminal units. The tail terminal unit includes a yoke means for connecting the tail terminal unit to the boring machine and a belt-engaging drum rotatably mounted in the yoke to form the outer end of the tail section for receiving material from the machine. The holdback and drive units each have means for securing them in spaced relation on the surface on which they rest with the drive unit located between the holdback unit, and the tail terminal unit. The drive unit includes motor-driven drum means for engaging the belt and driving a top flight of the tail section from the tail terminal unit towards the drive unit and means for discharging from the top flight. A pair of parallel guide cables is suspended between the drive and holdback units. The holdback unit includes a carriage mounted for travel longitudinally of the cables, a belt-engaging drum rotatably mounted on the carriage and forming an outer end of the belt storage section, and a cable pay out means having a cable extending to the carriage for permitting controlled movement of the carriage towards the drive unit to thereby allow shortening of the storage section between the drum of the holdback unit and the drive unit as the tail unit is lengthened by movement of the tail terminal unit away from the drive unit with the boring machine.

Accordingly, in the present invention in which the holdback unit, drive unit and tail terminal unit are their separate units, the use of an expensive and cumbersome framework is avoided. Moreover, once the carriage of the holdback unit has advanced to the drive unit because of the movement of the boring machine a considerable distance away from the drive unit, the belt may be broken, the carriage returned to the holdback unit, and an extra length of belt inserted. The advance of the tail terminal unit with the boring machine can then continue away from the drive unit.

Moreover, since the units are separate, and smaller in size relative to known devices, each unit may be readily moved from one location to the mine to another. Preferably, the holdback and drive units are provided with skid means to facilitate the movement of the units.

BRIEF DESCRIPTION OF THE DRAWINGS

Referring to the accompanying drawings, which show preferred embodiments of the invention, by way of example:

FIG. 1 is a broken plan view of the conveyor system of the present invention;

FIG. 2 is a side view of the conveyor system of FIG. 1;

DESCRIPTION OF PREFERRED EMBODIMENT

Figure 4:
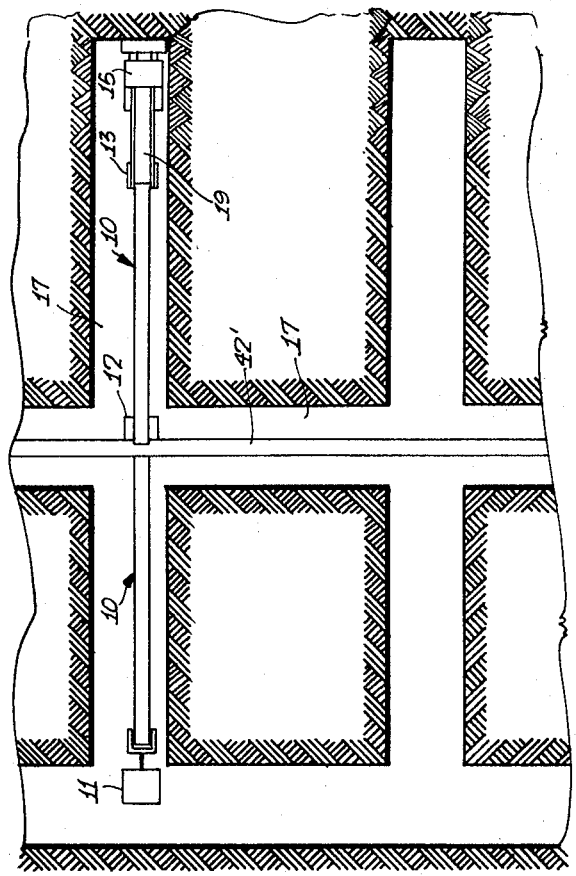
FIG. 4 is a sectional view through a series in a mine passageway showing an alternative arrangement of the conveyor system of the present invention.

In the drawings, reference numeral 10 generally denotes an extendible conveyor having a holdback unit 11, a drive unit 12, and tail terminal unit 13, which are three completely separate units supporting an endless belt 14. The tail terminal unit 13 is connected to the rear of a machine 15, which may be of the type commonly called a boring machine but which is hereinafter termed a loading machine. In the embodiment illustrated, therefore, the loading machine is of the type which simultaneously bores into the end of the passageway to remove material and transfers the material to the rear by way of a conveyor 19 (FIG. 2) mounted on the machine. Thus, as the loading machine advances along surface 16 to extend passageway 17, the terminal tail unit is pulled away from the drive unit 12 which is secured to surface 16. Holdback unit 11 is also fixed to surface 16 on the opposite side of the drive unit 11 as the tail terminal unit 12 and in spaced relation to the drive unit 11. The belt between the tail terminal unit 13 and drive unit 12 forms tail section 20 of the extendible conveyor 10, and the belt between the holdback unit 11 and drive unit 12 forms the storage section 21 of the conveyor.

The drive unit 12 includes a main frame 22 forming a base 23 on which is mounted a drive motor 24. On opposite sides of the base 23, the frame has downwardly depending sidewalls 25 so as to provide therebetween a longitudinal passage for the belt. The lower edges of the sidewalls 25 provide longitudinally extending skids 26 which rest on surface 16 and on which the drive unit 12 slides when it is pulled or pushed from one location to another. Adjacent the lower edges of the side walls 25 are laterally projecting side flanges 27 which have bores or openings receiving securing means in the form of bolts 30. Bolts 30, which are of the expansion type, are anchored in pinholes 31 drilled into the surface 16 forming the floor of the mine. Thus, the drive unit 13 is secured against movement in any direction once it has been fixed in place by bolts 30.

Extending upwardly from base 23 is a pair of parallel side support members 32, 32 between which is carried a pair of parallel belt-engaging drums 33, 34 which provide drive means of the drive unit 12, drum 33 being mounted for rotation in journals 35, 35 and drum 34 being mounted for rotation in journals 36, 36. Drum 33 is elevated and spaced further away from tail terminal unit 13 than drum 34, and upper flight 37, which is the material-carrying flight of tail section 30, extends from the tail terminal to the drive unit and passes over and around drum 33 and then passes back and around drum 34. Thus, by passing around drum 33, a dropoff point for the material is formed, and in the embodiment shown in FIGS. 1 and 2, a chute 40 is carried by the drive unit 12 for catching the material discharged from the upper flight 37. The chute 40 has an upper end 41 located under drum 33, and the chute extends to one side of the extendible conveyor 10 for directing the material to a panel conveyor 42 (FIG. 2) which runs parallel to the conveyor 40 for carrying the material further back in passageway 17 away from the extendible conveyor 10.

Drive motor 24 drives a reduction gear means 43 which has an output which is drivingly connected by a belt or chain 44 to drum 34. The direction of rotation of drum 34, as seen in FIG. 2, is clockwise so that upper flight 37 moves toward the drive unit 12.

The tail terminal unit includes a yoke member 45 formed by a transverse portion 46 and a pair of spaced legs 47, 47 fixed to the transverse portion. A belt-engaging drum 50 is rotatably mounted between legs 47, 47. The transverse portion 46 has a pair of vertically spaced lugs 51 which receive the rear portion of a tongue 52 therebetween, and a common pin 53 which passes through the legs and the tongue provides a swivel connection between the tongue and yoke. The forward end of tongue 52 is provided with a channel portion 54 having inturned fingers 55, 55 so as to receive a transverse bar 56 of T-shaped cross section fixed to the rear of the loading machine 15 whereby the tongue is secured to the loading machine but is free to slide transversely relative to the machine. A hydraulic cylinder 57, which is connected at one end 58 to the loading machine has its piston rod 60 pivotally connected to the tongue by a pin 59. Accordingly, hydraulic cylinder 57 may be activated to expand or contract and thereby shift the tongue 52 relative to the loading machine to accomplish accurate alignment of the tail section of the conveyor.

The holdback unit 12 has a main frame 61, under which are provided skids 62 to facilitate its movement when the conveyor is being relocated. The main frame has lateral side flanges, like the drive unit 12, so that it may be anchored in place by securing means in the form of expansion bolts 30 received in pinholes drilled in the floor of the mine. Mounted on a base 68 formed by main frame 61 is a hydraulic tank 63, an electric motor 64 and a hydraulic pump 65, which are adapted to supply fluid under pressure for driving a hydraulic motor 66. The hydraulic motor is adapted to drive a pressure-sensitive winch 67 which is also mounted on main frame 61. Projecting upwardly from the base 68 are sidewalls 70, 70, and a shaft 71, extending between the sidewalls 70, 70, carries a pulley 72.

A pair of horizontally spaced, parallel cables 73, 73, is clamped at one end to the frame of the holdback unit 11 and is similarly fastened at the other end to the frame of the drive unit 12. A carriage 74, which is associated with the holdback unit and is slidably carried by the cables 73, 73, is thereby suspended between the holdback unit and drive unit so that the carriage can move between the two units. The carriage has a transverse portion 75, and side legs 76, 76, through which the cables 73, 73 extend. A belt-engaging drum 77 is rotatably mounted between legs 76, 76. A cable 80 of the pressure-sensitive winch 67, which cable extends back from the winch and around pulley 72, is connected to the carriage 74.

As previously described, the upper flight 37, which is the load-carrying section of the conveyor, is driven from the tail terminal unit, where the upper flight is loaded by the conveyor 19 of the loading machine, to the drive unit 12. After passing around drums 33 and 34, the best extends to drum 77 of the holdback unit 11 and passes around the drum 77. Lower flight 79 of the best 14 extends from drum 77, under the base 23 of the drive unit 12, and to the drum 50 which forms the outer end of the tail section 20.

The pressure-sensitive winch is set to pay out the cable 80 only when the pull on cable 80 exceeds a set tension. Accordingly, the belt 14 is kept taut, and as loading machine 15 moves away from the drive unit, the winch 67 permits restrained movement of carriage 74 towards the drive unit 12. Thus, as the tail section 20 is lengthened by the advance of the loading machine, the storage section 21 is automatically reduced in length to provide the extra best for the tail section.

Figure 3:
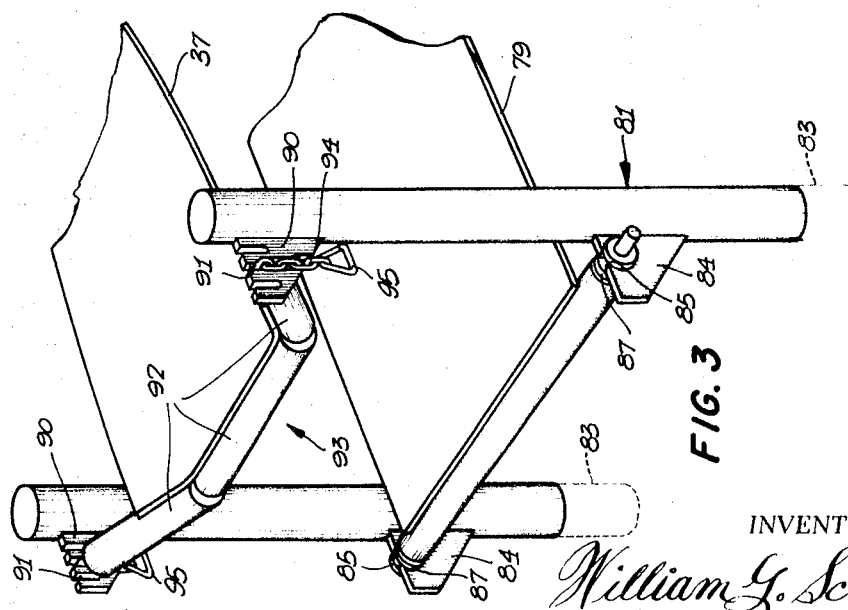
FIG. 3 is a perspective view of a portion of the conveyor system illustrating an intermediate support means.

As the tail terminal unit is pulled away from the drive unit 12, a plurality of collapsible intermediate support means 81 are provided to carry the belt between the tail terminal unit and the drive unit. Each support means 81 is of a type which can be readily carried to the tail section and erected at regular intervals therealong. The support means includes a pair of posts 82, 82 (FIG. 3) each of which has a lower portion for reception in pinholes 83 drilled in the mine floor on opposite sides of the belt. The posts 82, 82 have a pair of aligned lower brackets formed by plate members 84, 84 secured thereto, the plate members having upwardly opened slots 85, 85. A rigid roller 86 is mounted between the lower plate members 84 for carrying lower flight 79 of the belt. The rigid roller 86 includes a roller shell 88 rotatably mounted on a shaft, the roller shell defining annular grooves 87, 87 between opposite ends of the roller shell and spools 89, 89. The diameter of the shaft within grooves 87 87 is small enough to be received in the slots 85, 85 so that the slots hold the roll and the edges of the grooves engage the sides of the plate member to axially position the roll and further to brace the posts and thereby stabilize the intermediate support means.

The posts 82, 82 are also provided with aligned upper brackets in the form of parallel plate members 90, 90 which have upwardly opened slots 91. Suspended between plate members 90, 90 is a catenary-type idler 93 formed by a plurality of rollers 92 connected in end-to-end fashion by flexible means in a known manner. The idler 93 sags so that the upper flight 37 of the tail section is troughed to thereby have a larger carrying capacity. At opposite ends the rollers 92 have a length of chain attached thereto, which chain is received in the slots 91 to connect the idler between the plate members. At least one of the length of chains has a handle member 95 connected to its outer end so that the idler 93 may be readily carried when the intermediate support means is in a disassembled condition.

In the embodiment of the invention shown in FIG. 4, the holdback unit 11, drive unit 12 and tail terminal unit 13 are located in passageway 17 exactly as in the previously described arrangement, but instead of discharging the material onto a parallel panel conveyor 42 by way of chute 40, the material is discharged directly onto a panel conveyor 42' by the drive unit 12. The panel conveyor 42' is disposed perpendicularly in relation to extendable conveyor 10 in a passageway 17' which intersects passageway 17. The panel conveyor simply has an upper material-carrying flight which runs partially under drum 33 of the drive unit 12 so that the material falls on to the panel conveyor as the belt of the upper flight 37 of the tail section 20 passes over drum 33.

It is believed apparent from the above description that the extendible conveyor of the present invention is of simple design and is of a versatile nature for use with movable loading machines such as boring machines now utilized in mining. The holdback unit and drive unit may be easily pulled into location in a portion of a passageway which has already been formed and then anchored in position by using tools readily available in the mine. Once in location, the tail terminal unit may be attached to the loading machine, and with carriage 74 retracted to the holdback unit, the belt may be wrapped around the drums of the units and joined. As the loading machine moves away from the drive unit, the tail section is automatically lengthened and the carriage 74 slides along cables 73, 73. Periodically, an additional intermediate support means 81 may be added to provide sufficient support for the upper flight 37, which carries the material from the loading machine to the drive unit. The intermediate support means may be readily assembled during operation by simply drilling two pinholes, inserting the posts and attaching the idler 93 and roller 86. When the carriage 74 approaches the drive unit 12 so that no additional stored belt is available, the conveyor may be stopped and the endless belt broken so that hydraulic motor 66 may be run to rewind cable 80 and thereby pull carriage 74 back to the holdback unit 11. An extra length of belt may be then joined into the belt and the operation of the conveyor continued with the loading machine continuing its progress away from the drive unit. The length to which the tail section may be extended is not limited, therefore, by the structure of the conveyor. Furthermore, when the operation in the passageway is completed, the conveyor may be readily disassembled and moved to another location in the mine.

It is believed apparent that various modifications may be made to the above-described embodiments, which have been presented to illustrate examples, without departing from the spirit of the invention as defined in the appended claims.

I claim:

1. An extensible conveyor of the type having an endless belt providing a tail section movable with a loading machine for receiving material from said machine as said machine travels along a surface, said conveyor comprising: separate holdback, drive and tail terminal units; said tail terminal unit including a yoke means and forming an outer end of said tail section; said holdback and drive units each having securing means for fixing said holdback and drive units in fixed spaced relation on said surface with said drive unit located between said holdback unit and said tail terminal unit; a pair of parallel guide cables suspended between said drive and holdback units; said drive unit including motor-driven drum means for engaging said belt and driving a top flight of said tail section from said tail terminal towards said drive unit, and means for discharging material from said top flight; said holdback unit including a carriage mounted for travel longitudinally of said cables, a belt-engaging drum rotatably mounted on said carriage and forming an outer end of a belt storage section, and a cable payout means having a cable extending to said carriage for permitting controlled movement of said carriage towards said drive unit to thereby allow shortening of the storage section between the drum of said holdback unit and said drive unit as said tail terminal unit is moved away from said drive unit by said loading machine.

2. An extensible belt conveyor system of the type having a tail section movable with a loading machine for receiving and transferring material from said machine to a fixed discharge point as said machine travels along a surface, said conveyor system comprising: an endless belt defining an extensible tail section and a storage section of a first conveyor; a drive unit at the material discharge point of said conveyor, said drive unit including a frame having securing means for anchoring said drive unit in a fixed location on said surface, and motor-driven drum means mounted on said frame and engaging said belt for driving an upper flight of said tail section towards said discharge point, a holdback unit having a frame provided with securing means for anchoring said holdback unit in a fixed location on said surface in spaced relation to said drive unit and on the opposite side of said drive unit as said tail section; a pair of horizontally spaced parallel cables suspended between the frames of said holdback and drive units; said holdback unit including a carriage carried by said cables for reciprocal movement between said frames, a drum rotatably mounted on said carriage and having said belt passing therearound to define an outer end of said storage section, and a cable payout means mounted on the frame of said holdback unit and having a cable extending to said carriage for permitting restrained movement of said carriage towards said drive unit to thereby shorten said storage section and thereby provide belt for said tail section; and a tail terminal unit including a yoke means for connecting said tail terminal unit to said loading machine, and a drum rotatably mounted in said yoke, said belt having a lower flight extending from said drum on said carriage to said drum in said yoke and said belt passing around said drum in said yoke to define an outer end of said tail section.

3. A conveyor system as defined in claim 2, wherein said motor-driven drum means includes a pair of parallel belt-engaging drums, one of said drums being elevated and being located further away from said tail terminal unit, relative to the other drum, said upper flight extending from said drum of the tail terminal unit and around said one drum prior to passing down and around said other drum whereby the belt passing around said one drum forms a dropoff point for the material.

4. A conveyor system as defined in claim 3, and further comprising a chute having an upper end located under said one drum for receiving material discharged from said upper flight, said chute extending to one side of said drive unit for depositing material on another conveyor running parallel to said first conveyor.

5. A conveyor system as defined in claim 3, and further comprising a second conveyor extending perpendicular to the first conveyor and having an upper flight under said one drum for receiving material discharged from the upper flight of the first conveyor.

6. A conveyor system as defined in claim 3, wherein a motor is mounted on the frame of said drive unit, and comprising means drivingly connecting said motor to said other drum.

7. A conveyor system as defined in claim 2, wherein said payout means of said holdback unit includes a power winch means for rewinding the cable extending to said carriage whereby said carriage may be pulled back towards said holdback unit.

8. A conveyor system as defined in claim 2, wherein said frames of said holdback and drive units are provided with skid means for engagement with said surface whereby said units may be readily relocated.

9. A conveyor system as defined in claim 2, wherein said means for securing the frames of said holdback and drive units includes expansion bolts received in openings in said frames and extending into pinholes drilled in said surface.

10. A conveyor system as defined in claim 2, and further comprising collapsible intermediate support means for the belt of said tail section, said support means comprising a pair of posts each having a lower portion for reception in pinholes drilled in said surface on opposite sides of said belt, said pair or posts having aligned upper brackets and aligned lower brackets, a first belt-engaging member removably supported between the upper brackets for carrying said upper flight, and a second belt-engaging member removably supported between said lower brackets for carrying said lower flight.

11. A conveyor system as defined in claim 10, wherein said upper brackets include parallel plate members secured one each to said posts, said plates having upwardly opened slots, and wherein said first belt-engaging member comprises a catenary-type idler formed by a series of flexibly connected rollers, said idler having portions of chain connected to opposite ends thereof for reception in said slots to thereby suspend said idler between said upper brackets, and a handle member secured to one of said portions of chain.

12. A conveyor system as defined in claim 10 wherein said lower brackets include parallel plate members secured one each to said posts and having upwardly opened slots, and wherein said second belt-engaging member comprises a rigid roller member having annular grooves defined by sections of reduced cross section at opposite ends thereof for reception in the slots of the lower brackets.